United States Patent [19]

Champseix

[11] Patent Number: 5,027,857
[45] Date of Patent: Jul. 2, 1991

[54] SWITCHING MICROELECTROVALVE HAVING A SINGLE DIAPHRAGM

[75] Inventor: Serge Champseix, Les Mureaux, France

[73] Assignee: ABX, Levallois, France

[21] Appl. No.: 519,248

[22] Filed: May 2, 1990

Related U.S. Application Data

[63] Continuation of Ser. No. 371,047, Jun. 26, 1989, abandoned.

[30] Foreign Application Priority Data

Jun. 30, 1988 [FR] France .................. 88 08808

[51] Int. Cl.$^5$ ................. F16K 7/16; F16K 11/02
[52] U.S. Cl. ................. 137/625.44; 251/129.2; 251/298; 251/303; 251/331
[58] Field of Search ........... 137/625.44; 251/298, 251/303, 331, 129.2

[56] References Cited

U.S. PATENT DOCUMENTS

| | | |
|---|---|---|
| 2,562,631 | 7/1951 | Morrison . |
| 2,935,086 | 5/1960 | Lehman et al. . |
| 3,067,764 | 12/1962 | Geary ............... 251/331 X |
| 3,067,942 | 12/1962 | Renne . |
| 3,991,788 | 11/1976 | Kull . |
| 4,251,053 | 2/1981 | Wurzer ............... 251/331 |
| 4,285,497 | 8/1981 | Güttel . |

FOREIGN PATENT DOCUMENTS

| | | |
|---|---|---|
| 7324333 | 6/1973 | Fed. Rep. of Germany . |
| 2223605 | 10/1974 | France . |
| 481335 | 12/1969 | Switzerland . |
| 1226481 | 3/1971 | United Kingdom .......... 137/625.44 |

*Primary Examiner*—Arnold Rosenthal
*Attorney, Agent, or Firm*—Fleit, Jacobson, Cohn, Price, Holman & Stern

[57] ABSTRACT

The diaphragm comprises an outer flexible part and a central part in which is overmoulded a rocking lever. The rod portion of said rocking lever is at right angles to the diaphragm plan and intended to be received in a recess of a sliding sleeve. The diaphragm rocking lever assembly is linked to an axle passing through the rocking lever and bearing on the valve body. The microvalve may be used in chemical and medical analysis devices.

7 Claims, 3 Drawing Sheets

SWITCHING MICROELECTROVALVE HAVING A SINGLE DIAPHRAGM

This application is a continuation of application Ser. No. 371,047, filed Jun. 26, 1989, now abandoned.

This invention relates to a switching microelectrovalve intended to be used with any fluid and more particularly to agressive or contaminated liquids. It more precisely relates to a microelectrovalve comprising a rocking lever and a sole diaphragm.

There are known microelectrovalves involving two flexible diaphragms made of plastics material and able to be deformed by means of an electromagnet on purpose to close certain apertures and open other ones. However the latter may have some drawbacks because it is difficult to set said microvalves due to the multiplicity of the constitutive members thereof. French Patent 87 00209 discloses a microelectrovalve intended to obviate these drawbacks in that said switching microelectrovalve having at least two ways comprises a valve body having a recess, to which are connected inlet and outlet fluid ducts and a movable member acting as a closure member for any one of said ducts and actuated by means of the core of an electromagnet. In said microelectrovalve the movable member is a diaphragm having an oriented deformation, which is applied by means of a rocking lever onto any one of the ducts to be closed and the rocking lever is moved from any of its balance positions corresponding to respectively any one of both closure positions for the diaphragm by means of a control member which is moved along the valve body by means of the core of an electromagnet.

Advantageously this control member consists of a sleeve sliding into the valve body, said control sleeve being located within a well passing through the valve body along the longitudinal axis thereof. One of its ends clears an open-end outlet in said well and its central portion comprises an aperture intended to engage a rod integral with the rocking lever. FR A 87 000209 describes a preferred embodiment wherein the rocking lever is shaped as a top having one advantageously tapered surface which bears by means of spring means on a corresponding surface of the closure diaphragm on purpose to apply the latter onto at least one aperture while setting free at least an adjacent aperture. The diaphragm thus connected to the motion of the rocking lever is able to tilt about an axle, a ball which is located on a seat of the valve body on purpose to be centered on the diaphragm being provided to this end.

As to limit the number of constitutive members, on purpose to render easier the mounting thereof, it has been contemplated to directly mold the duct bracket together with its ball and also to form the diaphragm integral with its rocking lever.

The development of the searches made in this field by the Applicant has lead the latter to made an electrovalve in accordance with that disclosed in French Patent 87 00209 but which is improved as regards the miniaturization, the build up simplicity and the operation accuracy thereof.

Accordingly the invention relates to a switching micro-electrovalve having at least two ways, comprising a valve body connected by a recess thereof to outlet and inlet fluid ducts for the fluid, and a single diaphragm acting as a closure member for said ducts and which is actuated by means of an electromagnet core through a rocking lever which applies said diaphragm onto either one of said ducts with respect to the position of a sliding sleeve moving along within the valve body by means of an electromagnet core.

According to the invention, the diaphragm comprises a flexible outer portion and a central portion overmolded on the rocking lever a portion of which which is rod-shaped and at right angles to the diaphragm plan, is intended to engage a recess provided in the sliding sleeve, the diaphragm-rocking lever assembly being linked to an axle passing through the rocking lever and bearing on wings integral with the valve body, the recess of the movable sleeve having a slight depth lesser than the sleeve thickness and radially oriented with respect to the axis of the valve body.

Advantageously the diaphragm is pinched between the edges of an aperture provided within a side of the valve body and a profiled bracket which closes said aperture, said side being generally shaped in cross-section as a widely opened V, having two V-shaped longitudinal flanges which surround the aperture.

Other advantages and particular features of the invention will become apparent on reading the following description of one embodiment illustrated in the accompanying drawings in which.

Figure 1:
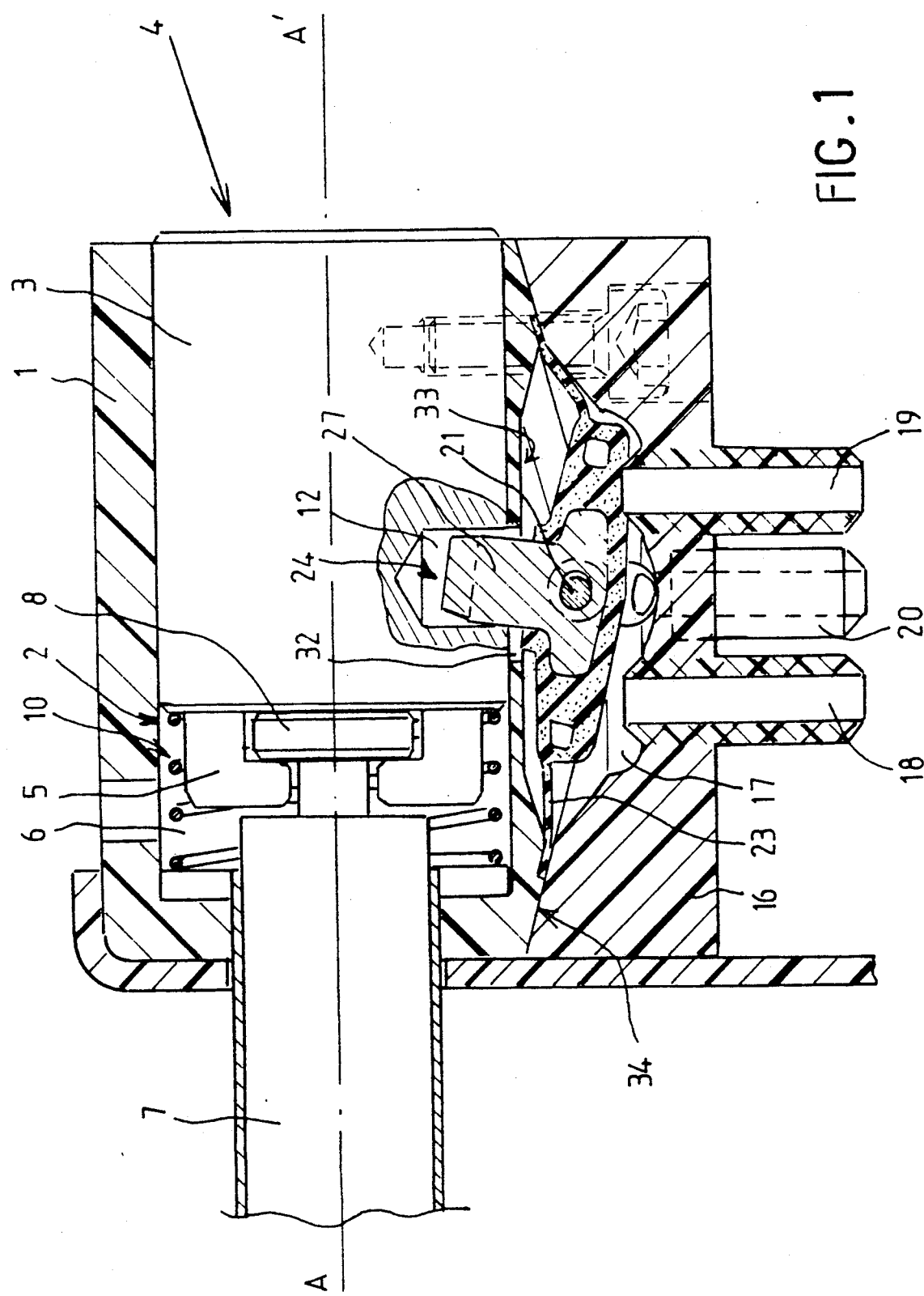
FIG. 1 is a diagrammatic cross-sectional view of the micro-electrovalve.

The micro-electrovalve shown in the drawing is generally shaped as a rectangular box made of plastics material, which forms the valve body 1. A cylindrical well 2 in which is located a control sleeve has been bored along the longitudinal axis AA' of said valve body 1. A cylindrical end 4 of said sleeve, which slide into the well 2 may flush with the outer end thereof. A chamber 6 is formed between the well bottom and the other end of the sleeve 3. This chamber 6 communicates with the external portion of the valve body 1 through an aperture engaging the movable core 7 of an electromagnet (not shown in the drawings). At one end of said core, is provided a core head shaped as a prong 8 for gripping a profiled jaw 5 formed at the end of the sleeve 3. A spring 10 is further located between the bottom of chamber 6 and the sleeve. In the latter is formed a shallow recess whose depth is less than the thickness of the sleeve and which is radially oriented with respect to the axis AA'.

Figure 2:
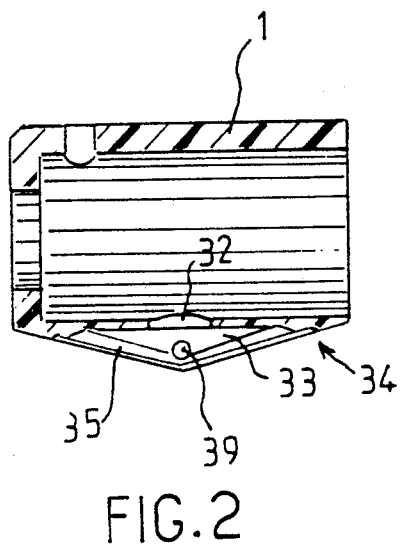
FIG. 2 is a cross-sectional view of the valve body.
Figure 3:
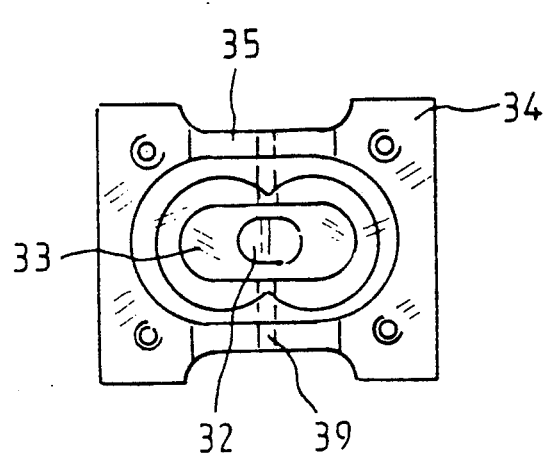
FIG. 3 is a plan view of the lower side of the valve body.
Figure 4:
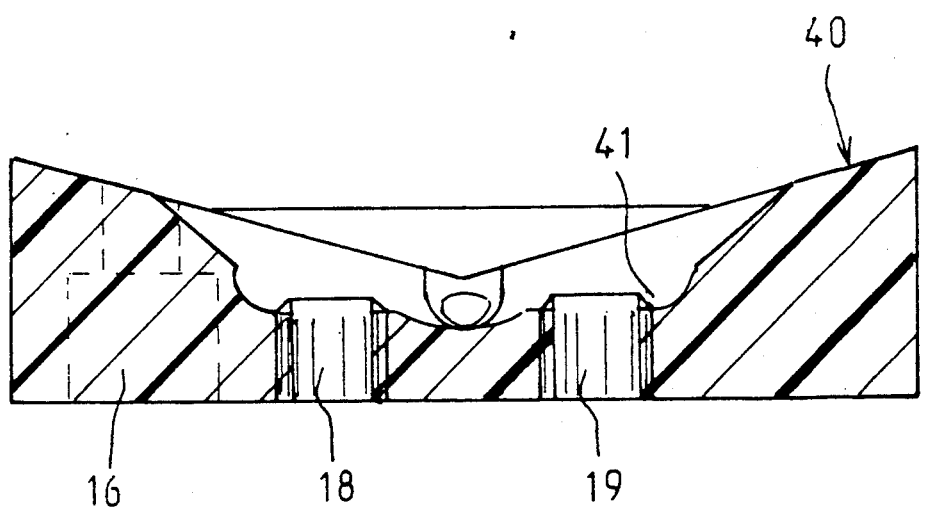
FIG. 4 is an enlarged cross-sectional view of the bracket secured to the valve body.
Figure 5:
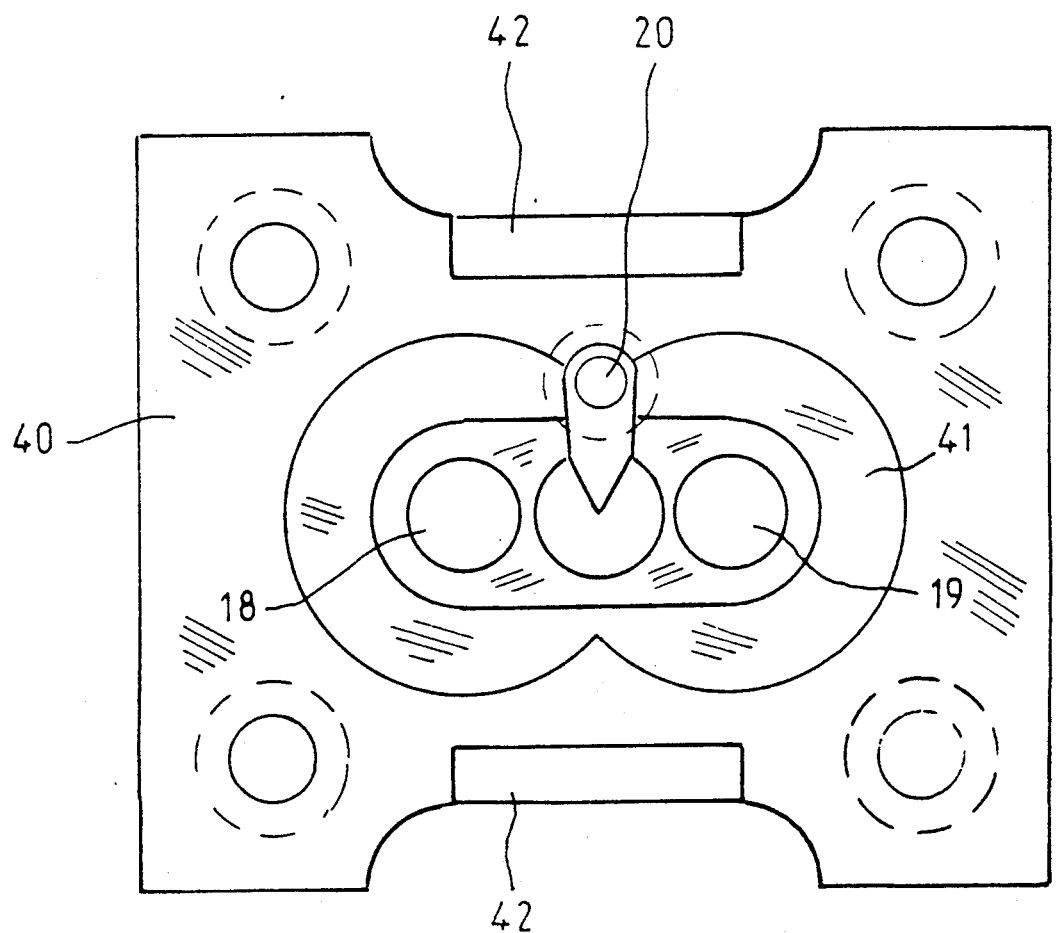
FIG. 5 is an enlarged plan view of the top surface of the bracket illustrated in FIG. 4.

A side 34 of the valve body 1 having the general shape of a widely opened V is further bored with an elongated aperture 32 at right angles to the sleeve aperture or recess 12. As more precisely shown in FIGS. 2 and 3, this elongated aperture 32 is itself centered into a generally oval cup whose hollow portion is obtained by moulding into said side 34 of said valve body. The cup 33 and the aperture 32 are centered on the tip of the V. Accordingly, on each side of the longitudinal edges of the hollow cup 33 are provided two longitudinal V-shaped flanges which hang over and surround the hollow cup 33 and the aperture 32 along the longitudinal edge thereof. The edges of cup 33 are so shaped as to form a seat for the tight diaphragm 23 which is pinched between the valve body and a closure bracket 16 which is secured to the valve body. The diaphragm forms with the closure bracket 16 a chamber having a slight volume 17. Three small ducts 18, 19 and 20 for supplying or discharging fluid are bored through bracket 16. Each of said ducts clears into said chamber 17 two ducts 18 and 19 are coupled to chamber 17 at a projecting crowned area on the bottom of bracket 16. The third duct 20 is directly connected to the bottom of said bracket 16. The shape and profile of bracket 16 are more clearly shown in FIGS. 4 and 5. There is shown an upper V-shaped surface area which corresponds to side 34 in the valve body. The three ducts 18, 29 and 20 are connected to the bottom of hollow elongated cup 41 which can also engage the diaphragm 23. Side ribs 42 are also provided on each side portion of bracket 16 and oppositely located with respect to hollow cup 41. The ribs 42 are intended to cooperate with corresponding recesses provided in the side portion 34 of valve body as to enable the bracket 16 to be perfectly located on said valve body 1 and to axially maintain the axle 21 at proper location.

Figure 6:
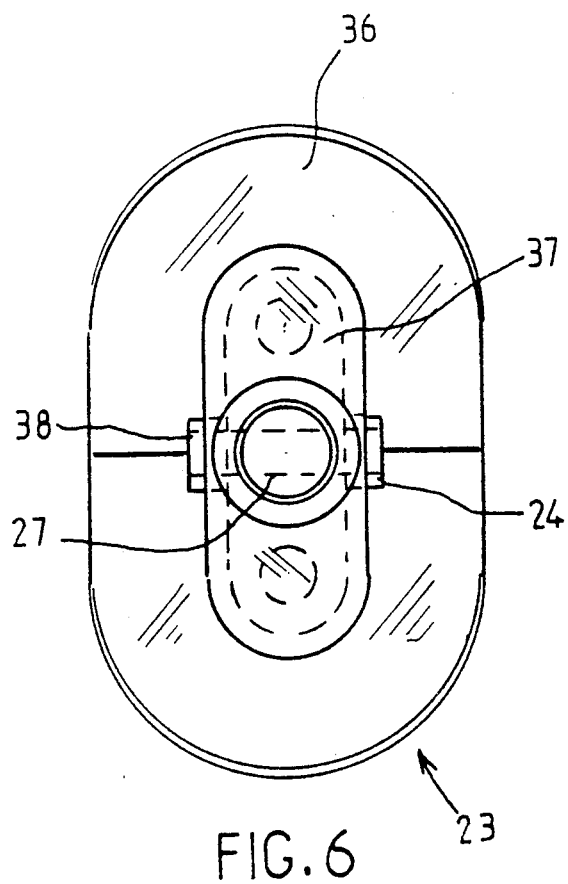
FIGS. 6 and 7 are respectively plan and cross-sectional views of the diaphragm with its rocking lever.
Figure 7:
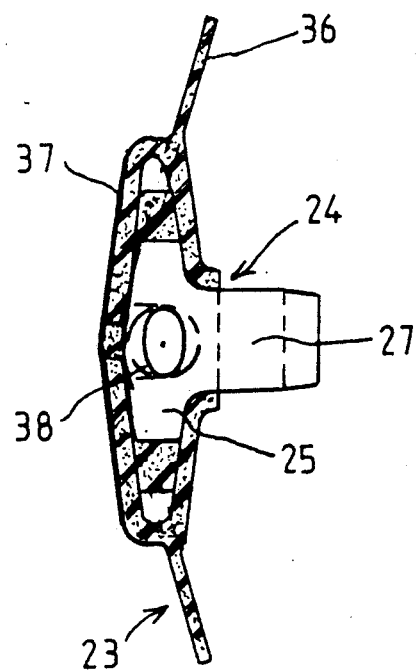

The diaphragm 23 has a peculiar structure which is better illustrated in FIGS. 6 and 7. It consists of a flexible external portion 36 which is very soft, slightly profiled as a V in a fashion similar to the profile of the valve body 1 and having an oval shape whose size corresponds to that of the cup 33, and of a central elongated portion 37 within which is sunk a rocking lever 24 one lower surface 25 of which matches the diaphragm profile whereas the upper portion thereof which is rod-shaped and at right angles to the diaphragm plane is engaged through aperture 32 and enters recess 12 in sleeve 3. The rocking lever 24 is provided with a through transverse bore 38. Said bore is elongated as to avoid the diaphragm 23 to be translated. As diaphragm 23 is pinched between the valve body 1 and the bracket 16, bore 38 is in alignment with apertures 39 provided at the V-profiled top of longitudinal flanges of the valve body, which form side wings hanging over the hollow cup 33. An axle 21 passing through both apertures 39 and bore 38 in the rocking lever ensures the location of the diaphragm and constitutes the pivoting axis thereof. It should be noted that said axle 21 is located along the diaphragm side which is not in contact with the fluid.

As shown in FIG. 1, the stem 27 of the rocking lever is so located as to be slightly inclined inwards recess 12 and thus kept in abutment against the recess edge. This inclination gives rise to an inclination of diaphragm 23 whose soft portion 37 is then applied in closed relationship against the duct aperture 19, while duct 18 is freely connected to chamber. This position is the "rest" one of the electrovalve, the electromagnet being then not energized. When biased by means of spring 10, sleeve 3 is kept, as shown in the drawing, at a location apart rightwards, the end thereof being flush with the opening of well 2. The fluid supplied in chamber 17 via duct 20 thus freely flows towards duct 18.

As the electromagnet is energized, core 7 exerts a pulling effect at the end 5 of sleeve 3 by means of its gripping head 8, as to counter-bias the pressure applied by spring 10. Then sleeve 3 is moved leftwards from its position shown in FIG. 1. During said motion, the edge of recess 12 has contacted the edge of rod 27 and driven the rocking lever 24 to pivot. The diaphragm 23 has then been inclined while pivoting about its axle 21 to a position reverse with respect to the previous one, wherein it is disengaged from conduct for being applied onto duct 18. The fluid passage is then established between duct 20 and duct 19. Due to the projection of the ends of ducts 19, 20 with respect to the cup bottom, the central elongated portion 37 of diaphragm 23 is able to be urged on its seat as to avoid any wrong tightness due to contaminants.

When the electromagnet is no longer energized, sleeve 3 is biased again by means of spring 10 to the initial position shown in FIG. 1 and the spring pressure, via the rocking lever, ensures a locking in this position. It should be noted that the user is also able to handle himself the sleeve while pushing on the end 4 which is flush with a side of the valve body 1, i.e. the valve may be manually actuated in case of failure of the electromagnet.

Since the chamber 17 between the diaphragm 23 and the bracket 16 has a small size, the dead volume of fluid is slight that facilitates the cleaning. Further the single diaphragm not only acts as a closure disk on its seat but also ensures a perfect tightness as regards the outer medium and the inner well 2 in which slides the sleeve 3. This tightness is ensured for the pressurized liquid fluids as well as for the gaseous fluids under high or low pressures, perhaps under vacuum. The bulking of the valve body 1 is reduced without limiting in this matter the cross-section of the fluid passage way through ducts 18, 19 and 20.

This swithing microvalve may be rigidly mounted in series in a restricted room, the ducts located on the same side being easy to be implanted. The microvalves are advantageously made of materials able to withstand agressive fluids and may be preferentially used in medical analysis devices and also in food plants and the like.

What is claimed:

1. A switching valve incorporating a valve body in which there is defined a recess and a flexible diaphragm sealingly secured across said recess and dividing the latter into two relatively sealed chambers, a first duct opening into one of said chambers from the exterior of said body and at least two additional ducts opening outwardly of said one chamber to the exterior of said body, a switching lever molded into a central part of said diaphragm and reinforcing and stiffening said center part of said diaphragm, said lever including a free end portion disposed in the other chamber, projecting out of said diaphragm center part and into the other chamber, a pivot axle mounted from said valve body and transverse in said other chamber, said center part of said diaphragm and the portion of said switching lever molded in said center part having a transverse opening formed therethrough opening into said other chamber and through which said axle extends for oscillation of said lever between opposite limit positions, said center part, when said lever is said limit positions, having different areas of said center part thereof sealingly disposed across said additional ducts closing the latter against fluid flow therethrough relative to said one chamber, and actuator means shiftably supported from said body for oscillatory movement between first and second positions and operatively associated with said lever for shifting the latter between said opposite limit positions responsive to shifting of said actuator means between said first and second positions thereof, said transverse opening being elongated in transverse cross section generally in the plane of said diaphragm, said two additional ducts opening into said one chamber toward portions of said diaphragm disposed on opposite sides of said transverse opening.

2. The valve of claim 1 including biasing means yieldingly biasing said actuator means toward one of said first and second positions thereof.

3. The valve of claim 2 including selectively operable motor means operatively associated with said actuator means for shifting the latter, against the biasing action of said biasing means, to the other of said first and second positions thereof.

4. The valve of claim 3 wherein said motor means comprises a electric solenoid.

5. The valve of claim 1 wherein said actuator means defines an outwardly opening recess opening outwardly of said actuator means in a direction disposed transverse to the path of said actuator means relative to said body, said lever free end portion being removably received in said recess.

6. The switching valve of claim 1 wherein said diaphragm is pinched between the edges of said body disposed about said recess and a profiled bracket which closes said recess, said one chamber being defined between said diaphragm and said recess and being profiled shaped as a widely open V having two longitudinal flanges which are V-shaped and surround said one chamber.

7. The switching valve of claim 1 wherein said one chamber has a generally oval shape and is contoured to act as a seat for the opposing side of said diaphragm.

* * * * *